United States Patent
Du et al.

(10) Patent No.: US 10,142,752 B2
(45) Date of Patent: Nov. 27, 2018

(54) INTERACTION WITH DEVICES

(71) Applicant: Beijing Zhigu Rui Tuo Tech Co., Ltd, Beijing (CN)

(72) Inventors: Lin Du, Beijing (CN); Wei Shi, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/109,120

(22) PCT Filed: Nov. 6, 2014

(86) PCT No.: PCT/CN2014/090439
§ 371 (c)(1),
(2) Date: Jun. 29, 2016

(87) PCT Pub. No.: WO2015/101105
PCT Pub. Date: Jul. 9, 2015

(65) Prior Publication Data
US 2016/0330559 A1    Nov. 10, 2016

(30) Foreign Application Priority Data
Dec. 31, 2013  (CN) .......................... 2013 1 0752762

(51) Int. Cl.
*H04R 29/00*   (2006.01)
*H04R 3/12*    (2006.01)
(Continued)

(52) U.S. Cl.
CPC ......... *H04R 29/002* (2013.01); *G06F 3/0416* (2013.01); *H04R 3/04* (2013.01);
(Continued)

(58) Field of Classification Search
CPC .......... H04R 3/12; H04R 29/002; H04R 3/04; H04R 2201/401; H04R 2499/15;
(Continued)

(56) References Cited

U.S. PATENT DOCUMENTS 4,359,606 A   11/1982  Shoichi
4,369,412 A   1/1983   Sakano
(Continued)

FOREIGN PATENT DOCUMENTS

CN        1554208 A    12/2004
CN      101170843 A     4/2008
(Continued)

OTHER PUBLICATIONS

Naef et al., "Spatialized audio rendering for immersive virtual environments", Proceeding VRST '02 Proceedings of the ACM symposium on Virtual reality software and technology, pp. 65-72, ACM New York, NY, USA, Nov. 2002. Retrieved on Jun. 8, 2016, 8 pages.
(Continued)

*Primary Examiner* — Yogeshkumar Patel
(74) *Attorney, Agent, or Firm* — Amin, Turocy & Watson, LLP

(57) ABSTRACT

An interaction apparatus comprises: a loudspeaker array, comprising speaker units, where each speaker unit is configured to make sound according to an input signal; an obstacle detection module, configured to detect an obstacle parameter corresponding to an obstacle inside space on a side of a sound-making surface of the loudspeaker array; and a compensation module, configured to adjust, according to the obstacle parameter, the input signal corresponding to a speaker unit of the speaker units, and compensate for a sound-making effect of the loudspeaker array influenced by the obstacle. A loudspeaker array comprising the speaker (Continued)

units can be disposed, an obstacle that influences a sound-making effect of the loudspeaker array can be detected, and an input signal of a corresponding speaker unit can be adjusted when the obstacle exists, thereby alleviating influence from the obstacle on the sound-making effect during use, and improving user experience.

28 Claims, 6 Drawing Sheets

(51) Int. Cl.
  *G06F 3/041* (2006.01)
  *H04R 3/04* (2006.01)
(52) U.S. Cl.
  CPC ......... *H04R 3/12* (2013.01); *H04R 2201/401* (2013.01); *H04R 2499/15* (2013.01)
(58) Field of Classification Search
  CPC ..... H04R 2430/00; H04R 3/00; G06F 3/0416; G06F 3/165
  USPC ............................................. 381/58; 348/36
  See application file for complete search history.

(56) References Cited

U.S. PATENT DOCUMENTS

| | | | |
|---|---|---|---|
| 4,379,209 | A | 4/1983 | Sakano |
| 4,990,286 | A | 2/1991 | Gordon |
| 5,361,305 | A | 11/1994 | Easley et al. |
| 6,005,957 | A | 12/1999 | Meeks |
| 6,760,451 | B1 | 7/2004 | Craven et al. |
| 6,798,889 | B1 | 9/2004 | Dicker et al. |
| 7,158,643 | B2 | 1/2007 | Lavoie et al. |
| 7,630,501 | B2 | 12/2009 | Blank et al. |
| 8,880,058 | B2 | 11/2014 | Helm et al. |
| 9,661,432 | B2 | 5/2017 | Silzle et al. |
| 2002/0071569 | A1 | 6/2002 | Wood |
| 2003/0008689 | A1* | 1/2003 | Uda ................... H04M 1/0214 455/569.2 |
| 2003/0048911 | A1 | 3/2003 | Furst et al. |
| 2003/0059069 | A1 | 3/2003 | Bank et al. |
| 2003/0142833 | A1 | 7/2003 | Roy et al. |
| 2003/0220705 | A1 | 11/2003 | Ibey |
| 2004/0202333 | A1 | 10/2004 | Csermak et al. |
| 2005/0008165 | A1 | 1/2005 | Sack et al. |
| 2005/0152557 | A1 | 7/2005 | Sasaki et al. |
| 2006/0083391 | A1 | 4/2006 | Nishida et al. |
| 2006/0251265 | A1 | 11/2006 | Asada |
| 2007/0202917 | A1 | 8/2007 | Phelps et al. |
| 2008/0063211 | A1 | 3/2008 | Kusunoki |
| 2008/0085019 | A1 | 4/2008 | Wagenaars et al. |
| 2008/0273714 | A1 | 11/2008 | Hartung |
| 2009/0066499 | A1 | 3/2009 | Bai et al. |
| 2010/0008512 | A1 | 1/2010 | Packer et al. |
| 2010/0074451 | A1 | 3/2010 | Usher et al. |
| 2010/0272273 | A1 | 10/2010 | Chua et al. |
| 2010/0296658 | A1 | 11/2010 | Ohashi |
| 2012/0263309 | A1 | 10/2012 | Hiraki |
| 2012/0294450 | A1 | 11/2012 | Ozcan |
| 2013/0028430 | A1 | 1/2013 | Bares et al. |
| 2013/0070932 | A1 | 3/2013 | Nyu et al. |
| 2013/0073748 | A1 | 3/2013 | Masuda et al. |
| 2013/0089210 | A1 | 4/2013 | Martin et al. |
| 2013/0179163 | A1 | 7/2013 | Herbig et al. |
| 2013/0315419 | A1* | 11/2013 | Chien ................... H03G 7/00 381/98 |
| 2014/0307881 | A1 | 10/2014 | Fuertes, III |
| 2015/0139427 | A1 | 5/2015 | Sakai |

FOREIGN PATENT DOCUMENTS

| | | |
|---|---|---|
| CN | 101326075 A | 12/2008 |
| CN | 102006541 A | 4/2011 |
| CN | 102375536 A | 3/2012 |
| CN | 202276442 U | 6/2012 |
| CN | 103425335 A | 12/2013 |
| CN | 103702259 A | 4/2014 |
| CN | 103747409 A | 4/2014 |
| EP | 2429155 A1 * | 3/2012 |
| JP | 2007053610 A | 3/2007 |
| KR | 20110127930 A | 11/2011 |
| WO | 2012064285 A1 | 5/2012 |
| WO | 2012090032 A1 | 7/2012 |

OTHER PUBLICATIONS

International Search Report for International Application No. PCT/CN2014/090439, dated Feb. 3, 2015, 2 pages.
Office Action dated May 3, 2017 for U.S. Appl. No. 15/109,121, 133 pages.
International Search Report for International Application No. PCT/CN2014/090440, dated Feb. 10, 2015, 2 pages.
Office Action dated Nov. 15, 2017 for U.S. Appl. No. 15/109,121, 53 pages.
Notice of Allowance dated Jul. 17, 2018 for U.S. Appl. No. 15/109,121, 33 pages.

* cited by examiner

INTERACTION WITH DEVICES

RELATED APPLICATION

The present application is a U.S. National Stage filing under 35 U.S.C. § 371 of international patent cooperation treaty (PCT) application No. PCT/CN2014/090439, filed Nov. 6, 2014, and entitled "INTERACTION WITH DEVICES", which claims the benefit of priority to Chinese Patent Application No. 201310752762.2, filed on Dec. 31, 2013, which applications are hereby incorporated into the present application by reference herein in their respective entireties.

TECHNICAL FIELD

The present application relates to the field of interaction technologies, and in particular to interaction with devices, such as displays, speakers, etc.

BACKGROUND

During use of a loudspeaker, if an object completely or partially blocks a sound-making surface of the loudspeaker, for example, when an obstacle is close to the loudspeaker, a sound-making effect of the loudspeaker is influenced negatively, causing an undesirable experience for a user. Therefore, conventionally, in arrangement of a position of a loudspeaker, it blocking the sound-making surface of the loudspeaker is avoided as much as possible. However, in some scenarios, a sound-making surface of a loudspeaker may be unintentionally or unexpectedly blocked, or it may be further unavoidable to block a sound-making surface of a loudspeaker. For example, a transparent film loudspeaker appears, and may be applied on a surface of a screen to replace an existing loudspeaker and generate touch feedback, and the like; however, when the screen is a touchscreen, an unavoidable touch operation of a user on the surface of the screen negatively influences the sound making capability of the loudspeaker.

SUMMARY

An example, non-limiting objective of the present application is to provide an interaction technology, so as to alleviate influence on a sound-making effect of a loudspeaker from an obstacle on a surface of or near the loudspeaker during use as much as possible, and improving user experience.

According to a first aspect, an example embodiment of the present application provides an interaction apparatus, which comprises:

a loudspeaker array, comprising a plurality of speaker units, where each speaker unit is configured to make sound according to an input signal;
an obstacle detection module, configured to detect at least one obstacle parameter corresponding to at least one obstacle inside certain space on a side of a sound-making surface of the loudspeaker array; and
a compensation module, configured to adjust, according to the at least one obstacle parameter, the input signal corresponding to at least one speaker unit of the plurality of speaker units, and compensate for a sound-making effect of the loudspeaker array influenced by the at least one obstacle.

According to a second aspect, an example embodiment of the present application provides an interaction method, which comprises:

an obstacle detection step: detecting at least one obstacle parameter corresponding to at least one obstacle inside certain space on a side of a sound-making surface of a loudspeaker array, where the loudspeaker array comprises a plurality of speaker units, and each speaker unit is configured to make sound according to an input signal; and
a compensation step: adjusting, according to the at least one obstacle parameter, the input signal corresponding to at least one speaker unit of the plurality of speaker units, and compensating for a sound-making effect of the loudspeaker array influenced by the at least one obstacle.

In at least one embodiment of the present application, a loudspeaker array comprising a plurality of speaker units is disposed, an obstacle that influences a sound-making effect of the loudspeaker array is detected, and an input signal of a corresponding speaker unit is adjusted when the obstacle exists, thereby alleviating influence from the obstacle on the sound-making effect of the loudspeaker array during use of the loudspeaker array, and improving user experience.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Specific embodiments of the present application are further described in detail in the following with reference to the accompanying drawings (same numerals represent same elements in several accompanying drawings) and embodiments. The following embodiments are used to describe the present application rather than to limit the scope of the present application.

Figure 1:
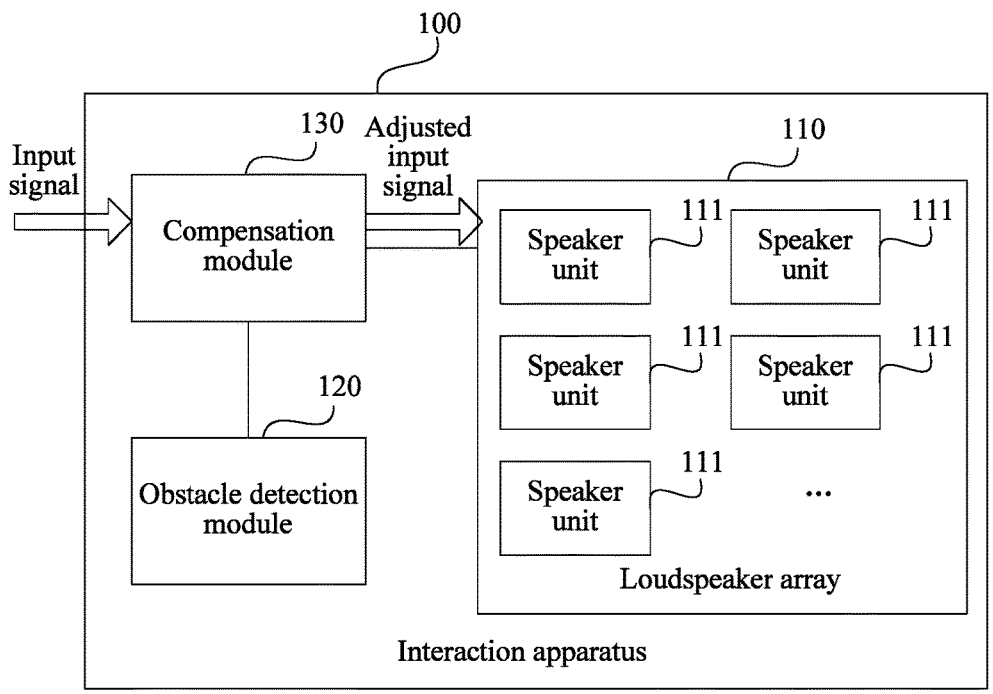
FIG. 1 is a schematic structural block diagram of an interaction apparatus according to an embodiment of the present application.

During use of a loudspeaker, when an obstacle exists inside a certain range on a side of a sound-making surface of the loudspeaker, for example, when the obstacle is very close to the loudspeaker, a sound-making effect of the loudspeaker is severely influenced, thereby influencing auditory experience of a user. Therefore, as shown in FIG. 1, an embodiment of the present application provides an interaction apparatus 100, which comprises:

a loudspeaker array 110, comprising a plurality of speaker units 111, where each speaker unit is configured to make sound according to an input signal;

an obstacle detection module 120, configured to detect at least one obstacle parameter corresponding to at least one obstacle inside certain space on a side of a sound-making surface of the loudspeaker array; and a compensation module 130, configured to adjust, according to the at least one obstacle parameter, the input signal corresponding to at least one speaker unit of the plurality of speaker units, and compensate for a sound-making effect of the loudspeaker array influenced by the at least one obstacle.

The obstacle detection module 120 may detect, in real time, whether an obstacle exists on the side of the sound-making surface of the loudspeaker array as well as some relevant attributes of the obstacle; therefore, during use of the interaction apparatus 100, when the obstacle exists, the compensation module 130 may perform proper compensation in real time.

In an example embodiment, the compensation module 130 may directly and correspondingly generate a completely new input signal according to the at least one obstacle parameter and a current input signal. In another example embodiment, the compensation module 130 superimposes, according to the at least one obstacle parameter, a compensation signal component on the input signal corresponding to each speaker unit; this example embodiment is further described hereinafter, and is not elaborated here. Here, the compensating for a sound-making effect of the loudspeaker array influenced by the at least one obstacle is: reducing a difference of a waveform of a sound wave, which is produced by the loudspeaker array under the influence of the at least one obstacle, at at least one target position (for example, the position of an ear of a listener) from a waveform when the obstacle does not exist.

Definitely, when no obstacle exists inside the space, the compensation module 130 makes no adjustment to the input signal. In an example embodiment, the compensation module 130 may compare and analyze the at least one obstacle parameter acquired by the obstacle detection module 120 and a preset reference parameter, to determine whether an obstacle exists as well as a position parameter and the like of the obstacle (for example, when the difference between the at least one obstacle parameter and the reference parameter is inside a set range, it corresponds to that no obstacle exists inside the foregoing space; when the difference is beyond the set range, it corresponds to that the obstacle exists inside the space, and the difference is analyzed to obtain position information and the like of the obstacle).

In conclusion, in this embodiment, a loudspeaker array comprising a plurality of speaker units is disposed, an obstacle that influences a sound-making effect of the loudspeaker array is detected, and an input signal of a corresponding speaker unit is adjusted when the obstacle exists, thereby alleviating influence from the obstacle on the sound-making effect of the loudspeaker array during use of the loudspeaker array, and improving user experience.

Figure 2:
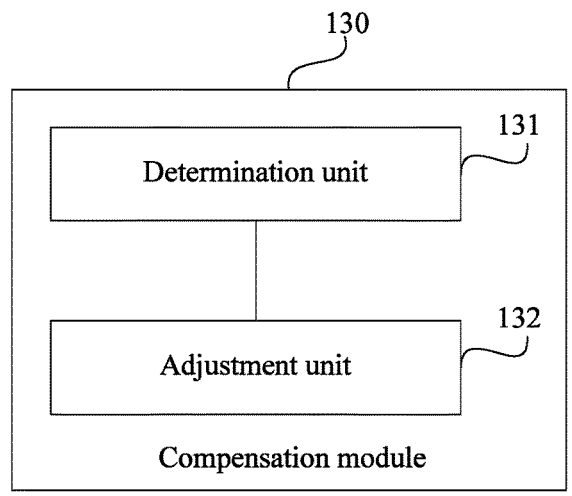
FIG. 2 is a schematic structural block diagram of a compensation module in an interaction apparatus according to an embodiment of the present application.

As shown in FIG. 2, in an example embodiment of the embodiment of the present application, the compensation module 130 comprises:

a determination unit 131, configured to determine, according to the at least one obstacle parameter, the at least one speaker unit and an input signal adjustment parameter corresponding to the at least one speaker unit; and an adjustment unit 132, configured to adjust, according to the input signal adjustment parameter, the input signal corresponding to the at least one speaker unit.

The input signal adjustment parameter comprises at least one of an amplitude adjustment parameter, a phase adjustment parameter, and a frequency adjustment parameter for the input signal.

Figure 2A:
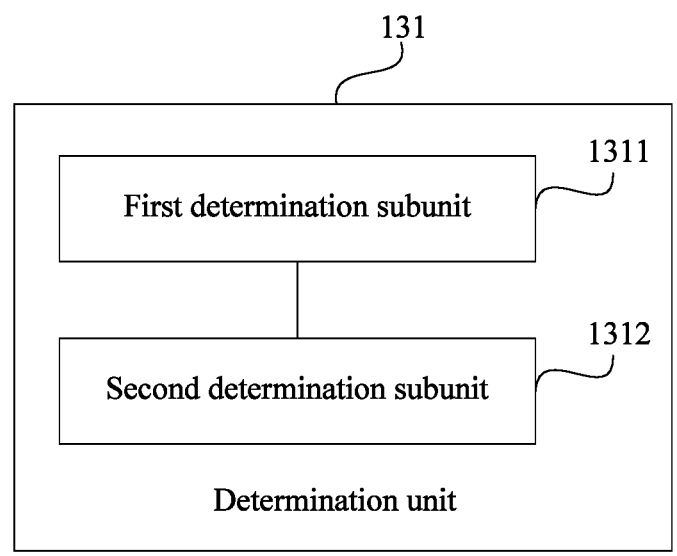
FIG. 2a is a schematic structural block diagram of a determination unit in an interaction apparatus according to an embodiment of the present application.

As shown in FIG. 2a, in this example embodiment, the determination unit 131 comprises:

a first determination subunit 1311, configured to determine, according to the at least one obstacle parameter, the position parameter of the obstacle; and a second determination subunit 1312, configured to determine, according to the determined position parameter of the obstacle, the at least one speaker unit and the input signal adjustment parameter corresponding to the at least one speaker unit.

Definitely, in another example embodiment of the embodiment of the present application, the first determination subunit 1311 may further be configured to determine at least one of following relevant parameters of the obstacle: a shape parameter of the obstacle, a posture parameter of the obstacle, and an acoustic characteristic parameter of the obstacle. The different relevant parameters of the obstacle in the foregoing cause different influence to a sound-making effect of a corresponding speaker unit. The posture parameter of the obstacle is a current posture parameter (for example, an included angle between a certain direction of the obstacle and the sound-making surface of the loudspeaker array) of the obstacle inside the certain space at the sound-making surface of the loudspeaker array; the acoustic characteristic parameter of the obstacle is a parameter such as an absorption rate and a reflection rate for a sound wave of the obstacle. The second determination subunit 1312 determines, according to the relevant parameters of the obstacle, a speaker unit that needs to be adjusted and an input signal adjustment parameter corresponding to the speaker unit that needs to be adjusted.

In this example embodiment, the determination unit 131 determines, according to the at least one obstacle parameter acquired by the obstacle detection module 120, which speaker units in the loudspeaker array need to be adjusted, and obtains, through calculation and processing, an input signal adjustment parameter corresponding to a speaker unit that needs to be adjusted, for example, obtains the input signal adjustment parameter by using a sound synthesis method such as sound ray tracing (Sound Ray Tracing) and a head related transfer function (HRTF).

Here, at least one speaker unit that needs to be adjusted may comprise an impeded speaker unit of which a sound-making direction is blocked by the obstacle; in this case, an input signal adjustment parameter corresponding to the impeded speaker unit may be, for example, an amplitude adjustment parameter for decreasing or increasing the amplitude of a current input signal of the impeded speaker unit. In addition, the at least one speaker unit that needs to be adjusted may comprise an unimpeded speaker unit. To compensate for an impeded sound-making effect of the foregoing impeded speaker unit, one compensation component relevant to the impeded speaker unit usually needs to be superimposed on an input signal corresponding to the unimpeded speaker unit; in this way, the speaker unit additionally produces a sound-making effect corresponding to the compensation component. Definitely, to ensure an overall sound-making effect of the loudspeaker array, compensation components corresponding to some speaker units may also be negative.

The appearance of a transparent loudspeaker, for example, a transparent film loudspeaker (for example, a transparent gel loudspeaker, in which another layer of transparent salt water gel is added on a surface of a transparent ionic gel film, and when being powered, the entire film deforms rapidly, so as to produce sound in full range) cause a loudspeaker to be applicable on a display screen. For example, a layer of transparent film loudspeaker is disposed on an outer surface of a display layer of an electronic device having a display function, and therefore it is no longer necessary to dispose a loudspeaker or another external loudspeaker near a display region of the electronic device. The applicant of the present application finds that, when the display screen is a touch display screen, a user needs to touch the surface of the screen to implement interaction with the electronic device, and in this case, a touch with a finger significantly influences a sound-making effect of a loudspeaker at the position of the touch.

Figure 3:
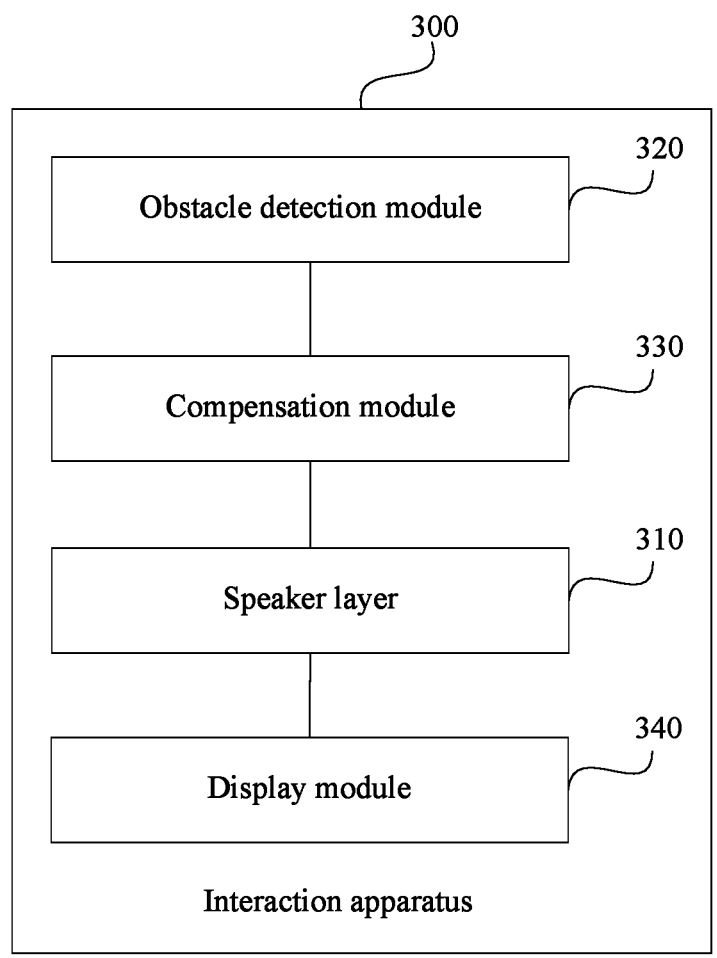
FIG. 3 is a schematic structural block diagram of an interaction apparatus according to an embodiment of the present application.

Therefore, as shown in FIG. 3, an interaction apparatus 300 is recorded in an example embodiment of an embodiment of the present application. The interaction apparatus 300 may be, for example, an electronic device, such as a personal computer, a smart phone, a mobile personal computer, and a tablet computer, that has a display function.

The interaction apparatus 300 comprises the loudspeaker array, the obstacle detection module 320, and the compensation module 330 that are recorded in the embodiment in FIG. 1, and in addition, further comprises a display module 340.

Figure 3A:
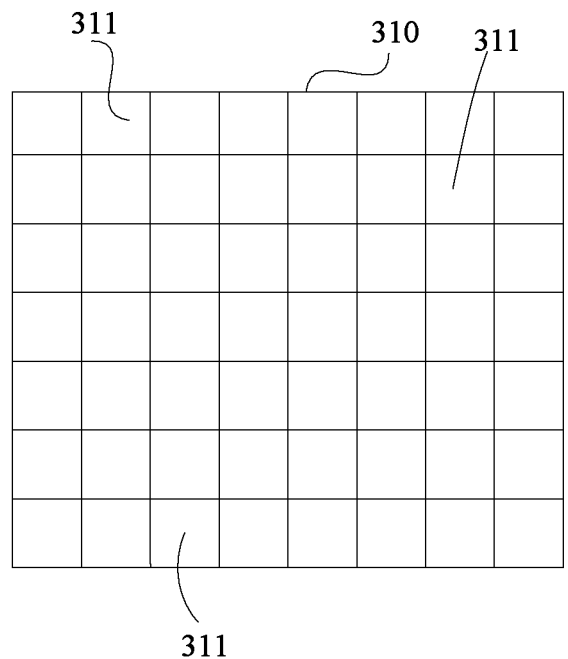
FIG. 3a is a schematic structural diagram of a loudspeaker array in an interaction apparatus according to an embodiment of the present application.

As shown in FIG. 3a, in this example embodiment, the loudspeaker array is a speaker layer 310 formed of a plurality of transparent film speaker units 311.

In this example embodiment, the display module 340 is a panel display module; however, persons skilled in the art may learn that the display module 340 may also have a shape such as a curved surface.

Figure 3B:
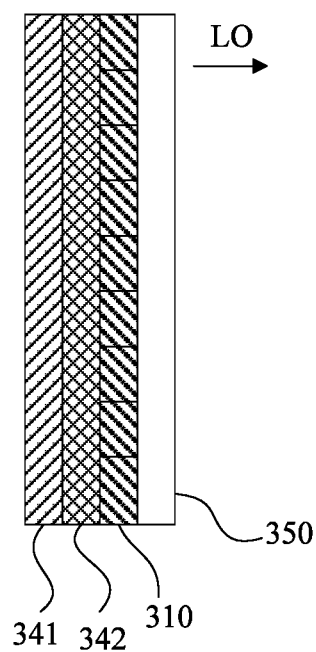
FIG. 3b is a schematic diagram of a layered structure of an interaction apparatus according to an embodiment of the present application.

As shown in FIG. 3b, in this example embodiment, the display module 340 comprises:
a display layer 341, configured to display an image corresponding to a display input signal; and
a touch input unit 342, located on a side of a light outgoing (LO) direction of the display layer 341, and configured to sense a relevant signal generated from a touch of a user, so as to obtain the position of the touch of the user and the shape of a touch surface. Definitely, here, the touch may be a direct touch, or may also be an indirect touch (for example, in this example embodiment, may be an indirect touch separated by the speaker layer 310 and a protection layer 350 mentioned below).

As shown in FIG. 3b, in this example embodiment, the speaker layer 310 is located on a side of a light outgoing direction of the touch input unit 342 (that is, a side where light emitted from the display layer 341 comes out from the touch input unit 342), and covers a display region of the display module 340. Definitely, persons skilled in the art may learn that in another example embodiment, the speaker layer 310 may also only cover a part of the display region of the display module 340.

Definitely, in addition to the foregoing structures, in another example embodiment of the embodiment of the present application, the display layer 341, the positions of the touch input unit 342 and the speaker layer 310 in the layered structure may also be in other forms; for example, the speaker layer 310 is located between the display layer 341 and the touch input unit 342.

In this example embodiment, a transparent protection layer 350 is further provided on the side of the light outgoing direction of the speaker layer 310 to produce an effect for protecting the speaker layer 310.

In this example embodiment, the function of the compensation module 330 may be implemented by a processor (not shown in FIG. 3, FIG. 3a, and FIG. 3b) in the interaction apparatus 300, or may also be implemented by a separate processing module (not shown), which is not elaborated here.

In this example embodiment, in addition to effects of input and interaction by a user, the touch input unit 342 may further serve as a touch sensing unit of the obstacle detection module 320. In this case, the part, for example, a finger, with which the user touches the touch input unit 342, is the obstacle that influences the sound-making effect of the loudspeaker array. In this example embodiment, the touch input unit 342 may be used to sense the position touched by the obstacle and the shape of the obstacle, so that the compensation module 330 determines influence from the obstacle on the sound-making effect of the loudspeaker array.

Because different acoustic characteristics of the obstacle also have different influence on the sound-making effect of the corresponding speaker unit, in another example embodiment of the embodiment of the present application, for example, the touch input unit may be further used to sense the type of the obstacle and an acoustic characteristic corresponding to the known type, so that the compensation module 330 performs compensation more effectively.

Figure 4:
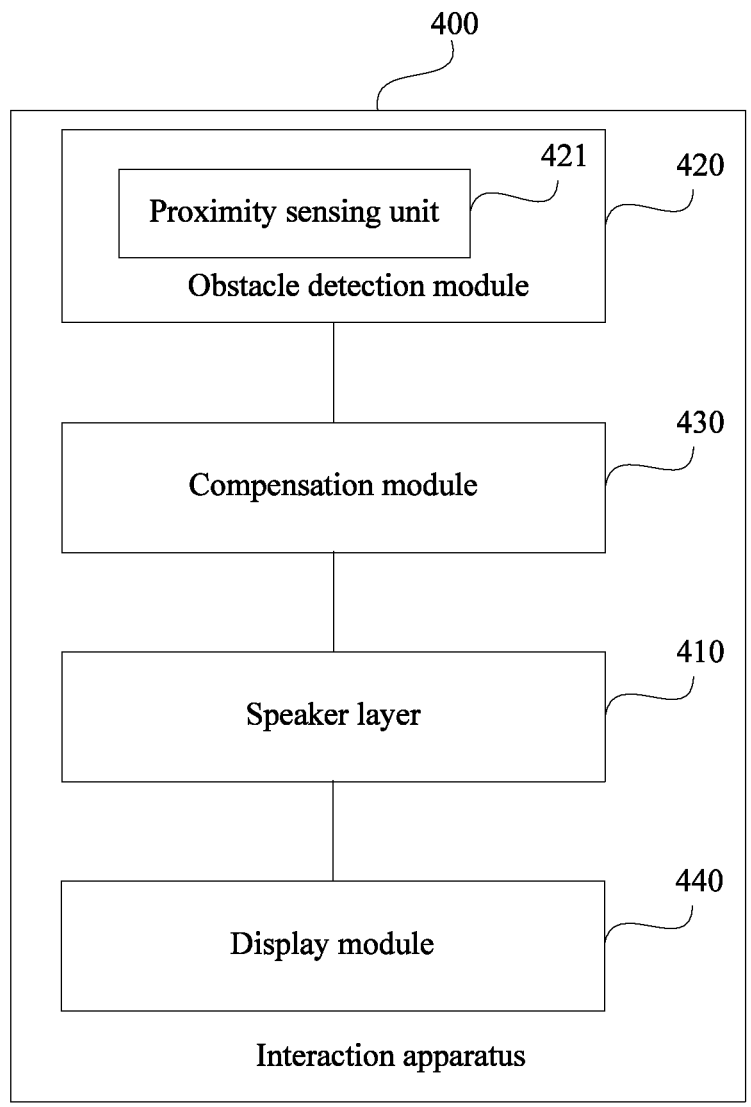
FIG. 4 is a schematic structural block diagram of an interaction apparatus according to an embodiment of the present application.

In addition to the foregoing touch, proximity without contact to the sound-making surface of the loudspeaker array may also influence the sound-making effect of the loudspeaker array; therefore, an embodiment of the present application further provides an interaction apparatus 400 in another example embodiment shown in FIG. 4. In this example embodiment, the interaction apparatus 400 comprises the module and units in the interaction apparatus shown in FIG. 3b, and the difference lies in that in this example embodiment, the obstacle detection module 420 in the interaction apparatus 400 further comprises a proximity sensing unit 421, configured to sense a position of the at least one obstacle (for example, a finger of a user) relative to the proximity sensing unit 421 inside a proximity sensing range, as well as the shape of a portion of the at least one obstacle inside the proximity sensing range.

In an example embodiment, the proximity sensing unit 421 may replace the touch input unit 342 in the embodiment shown in FIG. 3b, that is, implements the function of the display module 440 for input and interaction by the user and the function of the obstacle detection module 420.

In another example embodiment, the interaction apparatus 400 comprises both the touch input unit and the proximity sensing unit 421; in this case, the touch input unit only has the effect of a touch input unit in an existing touchscreen, and the proximity sensing unit 421 implements the function of the obstacle detection module 420. In this case, for example, the proximity sensing unit 421 may comprise a depth sensor, configured to acquire in real time a depth map of a facing direction of the sound-making surface of the loudspeaker array, and obtain the at least one obstacle parameter according to the acquired depth map.

Definitely, in addition to the several forms of the obstacle detection module in the foregoing, other structures that can detect at least one obstacle parameter inside the space may also be applied to an example embodiment of an embodiment of the present application.

Figure 5:
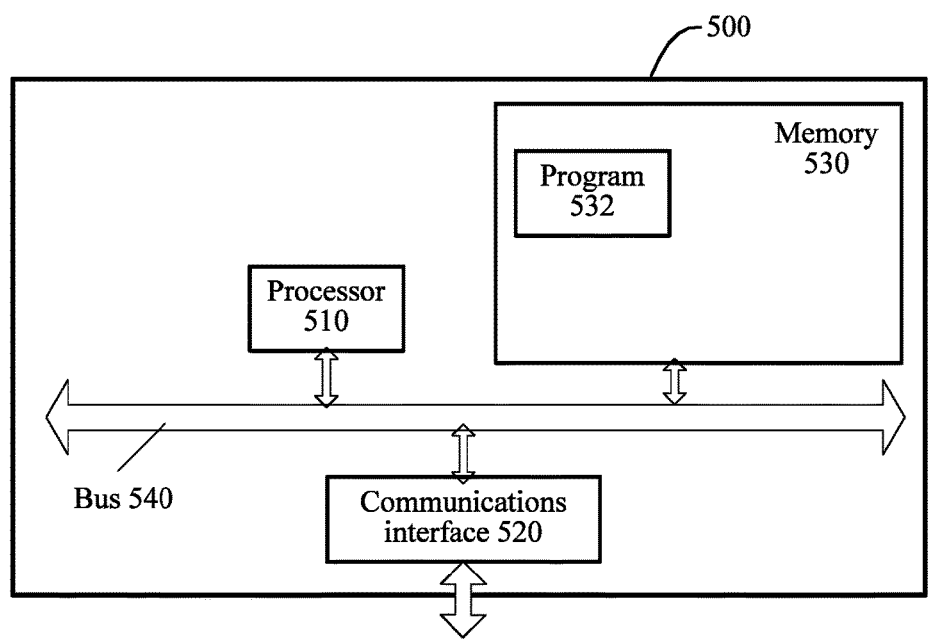
FIG. 5 is a schematic structural block diagram of an interaction apparatus according to an embodiment of the present application.

FIG. 5 is a schematic structural diagram of yet another interaction apparatus 500 provided by an embodiment of the present application. The embodiment of the interaction apparatus 500 is not limited in a specific embodiment of the present application. As shown in FIG. 5, the interaction apparatus 500 may comprise:

a processor 510, a communications interface 520, a memory 530, and a communication bus 540. Where:

the processor 510, the communications interface 520, and the memory 530 accomplish communication among each other by using the communication bus 540.

The communications interface 520 is configured to perform communication with a network element such as a client.

The processor 510 is configured to execute a program 532, and may specifically execute relevant steps in the following method embodiment.

Specifically, the program 532 may comprise a program code, where the program code comprises a computer operation instruction.

The processor 510 may be a central processing unit (CPU), or an application specific integrated circuit (ASIC), or one or more integrated circuits that are arranged to implement the embodiments of the present application.

The memory 530 is configured to store the program 532. The memory 530 may comprise a high-speed random access memory (RAM), or may also further comprise a non-volatile memory, for example, at least one disk memory. The program 532 may be specifically configured to cause the interaction apparatus 500 to execute the following steps:

an obstacle detection step: detecting at least one obstacle parameter corresponding to at least one obstacle inside certain space on a side of a sound-making surface of a loudspeaker array, where the loudspeaker array comprise a plurality of speaker units, and each speaker unit is configured to make sound according to an input signal; and a compensation step: adjusting, according to the at least one obstacle parameter, the input signal corresponding to at least one speaker unit of the plurality of speaker units, and compensating for a sound-making effect of the loudspeaker array influenced by the at least one obstacle.

For the specific implementation of each step in the program 532, reference may be made to the corresponding description of corresponding modules and units in the embodiments in FIG. 1 to FIG. 4, and the specific implementation is no longer elaborated here. Persons skilled in that may clearly understand that, for ease and simplicity of description, reference may be made to corresponding process description in the foregoing method embodiments for the specific work process of the devices and modules described in the foregoing, and the specific work process is no longer elaborated here.

In conclusion, by means of the several example embodiments of the embodiments of the present application in the foregoing, influence on a sound-making effect of a loudspeaker from an obstacle inside certain space of a sound-making surface of the loudspeaker may be alleviated, and in a case where the obstacle exists, desirable auditory experience may still be provide to a user.

Figure 6:
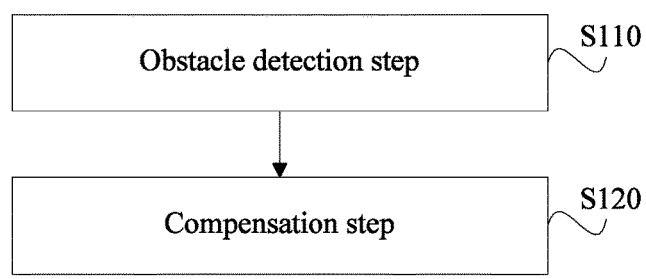
FIG. 6 is a schematic flow chart of an interaction method according to an embodiment of the present application.

As shown in FIG. 6, an embodiment of the present application provides an interaction method, which comprises:

S110. An obstacle detection step: Detect at least one obstacle parameter corresponding to at least one obstacle inside certain space on a side of a sound-making surface of a loudspeaker array, where the loudspeaker array comprises a plurality of speaker units, and each speaker unit is configured to make sound according to an input signal.

S120. A compensation step: Adjust, according to the at least one obstacle parameter, the input signal corresponding to at least one speaker unit of the plurality of speaker units, and compensate for a sound-making effect of the loudspeaker array influenced by the at least one obstacle.

In this embodiment, at least one obstacle parameter corresponding to an obstacle that influences a sound-making effect of a loudspeaker array comprising a plurality of speaker units is detected, and when the at least one obstacle parameter shows that the obstacle exists, an input signal of a corresponding speaker unit is adjusted, thereby alleviating influence from the obstacle on the sound-making effect of the loudspeaker array during use of the loudspeaker array, and improving user experience.

In the following, each step in the embodiment of the present application is further described.

S110. An obstacle detection step: Detect at least one obstacle parameter corresponding to at least one obstacle inside certain space on a side of a sound-making surface of a loudspeaker array, where the loudspeaker array comprises a plurality of speaker units, and each speaker unit is configured to make sound according to an input signal.

Here the "certain space" on the side of the sound-making surface of the loudspeaker array may be preset, or may also be obtained according to the performance of a detection module. For example, it may be preset that the certain space is space having the thickness of 1 centimeter that extends from the sound-making surface of the loudspeaker array along a sound-making direction. Alternatively, when the detection module comprises the touch input unit in the foregoing apparatus embodiment, the certain space may be space in which the touch input unit can sense signal input, for example, a sensing surface of the touch input unit.

In an example embodiment, the input signals corresponding to at least two speaker units in the plurality of speaker units are different. For example, the plurality of speaker units in the loudspeaker array may correspond to a plurality of different input signals, respectively; that is, the plurality of different input signals may be separately controlled. The plurality of speaker units may further be grouped into a plurality of speaker unit groups, and each speaker unit group comprises at least two speaker units, and the speaker units in each speaker unit group correspond to a same input signal (for example, one group of speaker units share one same conductor for signal input); such a structure may enable that when a sound-making effect of one or more of speaker units is impeded, a corresponding input signal is adjusted to cause other speaker units to compensate for an overall sound-making effect of the loudspeaker array. Here, for example, the input signal may be a vibration sequence signal, which comprises amplitude, frequency, phase information, and the like, so as to decide the amplitude, frequency, and phase of the vibration of the corresponding speaker unit. Definitely, in an optional example embodiment, the plurality of speaker units has a same input signal, and when the at least one obstacle is detected, the amplitude of the input signal may also be increased to compensate for the sound-making effect of the loudspeaker array.

S120. A compensation step: Adjust, according to the at least one obstacle parameter, the input signal corresponding to at least one speaker unit of the plurality of speaker units, and compensate for a sound-making effect of the loudspeaker array influenced by the at least one obstacle.

In an example embodiment, in the compensation step, a completely new input signal may be generated directly and correspondingly according to the at least one obstacle parameter and a current input signal. In another example embodiment, in the compensation step, according to the at least one obstacle parameter, a compensation signal component is superimposed on the input signal corresponding to each speaker unit; this example embodiment is further described hereinafter, and is not elaborated here. Here, the compensating for a sound-making effect of the loudspeaker array influenced by the at least one obstacle is: reducing a difference of a waveform of a sound wave, which is produced by the loudspeaker array under the influence of the at least one obstacle, at at least one target position (for example, the position of an ear of a listener) from a waveform when the obstacle does not exist.

Definitely, when no obstacle exists inside the space, in the compensation step S120, the input signal is not adjusted. In an example embodiment, in the compensation step, the at least one obstacle parameter acquired in the obstacle detection step and a preset reference parameter may be compared and analyzed, to determine whether an obstacle exists as well as parameters such as the position and shape of the obstacle.

In an example embodiment, the compensation step S120 comprises:

a determination step: Determine, according to the at least one obstacle parameter, the at least one speaker unit and an input signal adjustment parameter corresponding to the at least one speaker unit.

an adjustment step: Adjust, according to the input signal adjustment parameter, the input signal corresponding to the at least one speaker unit.

The input signal adjustment parameter comprises at least one of an amplitude adjustment parameter, a phase adjustment parameter, and a frequency adjustment parameter for the input signal.

In this example embodiment, the determination step comprises:

determining a position parameter of the obstacle according to the at least one obstacle parameter; and determining, according to the determined position parameter of the obstacle, the at least one speaker unit and the input signal adjustment parameter corresponding to the at least one speaker unit.

When the speaker unit is a transparent speaker unit, for example, a transparent film speaker unit, the loudspeaker array may be applied to a display screen of an electronic device, and in this scenario, the interaction method further comprises:

a display step: Perform display in a display region according to a display input signal, where the sound-making surface of the loudspeaker array covers at least one part of the display region.

In an example embodiment, the display region is a plane display region, and the sound-making surface of the loudspeaker array and the plane display region are superposed along a normal direction of the plane display region.

In this example embodiment, the obstacle detection step comprises:

sensing a position of the at least one obstacle in a touch sensing region and the shape of a portion of the at least one obstacle in the touch sensing region, where the touch sensing region covers at least one part of the sound-making surface of the loudspeaker array.

In an example embodiment, the touch sensing region covers the display region, the at least one obstacle parameter, such as the position of the at least one obstacle in the touch sensing region, acquired in the obstacle detection step may be further used for implementing interaction output corresponding to touch input of the user. For example, corresponding processing is performed according to the position of the obstacle in the touch sensing region, and a corresponding display input signal or an input signal corresponding to each speaker unit of the loudspeaker array is output.

In addition to the foregoing touch, proximity without contact to the sound-making surface of the loudspeaker array may also influence the sound-making effect of the loudspeaker array; therefore, in another example embodiment, the obstacle detection step comprises:

sensing a position of the at least one obstacle inside a proximity sensing range and the shape of a portion of the at least one obstacle inside the proximity sensing range.

In this example embodiment, as long as an obstacle gets close to the sound-making surface of the loudspeaker array and enters the proximity sensing range, a corresponding obstacle parameter may be obtained in the obstacle detection step, and an input signal of a corresponding speaker unit is adjusted in the compensation step.

Reference may be made to corresponding description of the apparatus embodiments in FIG. 1 to FIG. 4 for detailed implementation process of the steps in the foregoing, which are not elaborated here.

Persons skilled in the art may understand that in the foregoing methods in the specific embodiments of the present application, the sequence numbers of the steps do not mean an execution order, an execution order of the steps should be determined by the functions and internal logic of the steps, and the sequence numbers should not constitute any limitation on the implementation process of the specific embodiments of the present application.

It can be appreciated by those skilled in the art that each exemplary unit and method step described with reference to the embodiments disclosed in this text can be realized by electronic hardware or a combination of computer software and electronic hardware. Whether these functions are executed in a hardware mode or a software mode depends on the specific applications and design constraint conditions of the technical solution. The professional technicians can use different methods to realize the functions described with respect to each specific application, but this realization should not be considered to go beyond the scope of the present application.

If said function is realized in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or a network apparatus, etc.) to execute all or some steps of the method described in each embodiment of the present application. The preceding storage medium comprises various media which can store a program code, such as a USB disk, a mobile hard disk, a read-only memory (ROM), a RAM, a magnetic disk or an optical disk, etc.

The above embodiments are only used to describe the present application, without limiting the present application; various alterations and variations can be made by those skilled in the art without departing from the spirit and scope of the present application, so all equivalent technical solutions also belong to the scope of the present application, and the scope of patent protection of the present application should be defined by claims.

What is claimed is:

1. An apparatus, comprising:
  a loudspeaker array, comprising speaker units, wherein each speaker unit of the speaker units is configured to make sound according to an input signal, input signals corresponding to at least two speaker units in the speaker units being different;
  a memory that stores executable modules; and
  a processor, coupled to the memory, that executes the executable modules to perform operations of the apparatus, the executable modules comprising:
    an obstacle detection module configured to detect an obstacle parameter corresponding to an obstacle inside a space on a side of a sound-making surface of the loudspeaker array; and
    a compensation module configured to adjust, according to the obstacle parameter, the input signal corresponding to a speaker unit of the speaker units, to compensate for a sound-making effect of the loudspeaker array influenced by the obstacle resulting in a reduced difference between a first waveform at a target location corresponding to the loudspeaker array under the influence of the obstacle and a second waveform at the target location corresponding to the loudspeaker array when not under the influence of the obstacle.

2. The apparatus of claim 1, wherein the compensation module comprises:
  a determination unit configured to determine, according to the obstacle parameter, the speaker unit and an input signal adjustment parameter corresponding to the speaker unit; and
  an adjustment unit configured to adjust, according to the input signal adjustment parameter, the input signal corresponding to the speaker unit.

3. The apparatus of claim 2, wherein the determination unit comprises:
  a first determination subunit configured to determine, according to the obstacle parameter, at least one of a position parameter of the obstacle, a shape parameter of the obstacle, a posture parameter of the obstacle, or an acoustic characteristic parameter of the obstacle; and
  a second determination subunit configured to determine, according to a determined relevant parameter of the obstacle, the speaker unit and the input signal adjustment parameter corresponding to the speaker unit.

4. The apparatus of claim 2, wherein the input signal adjustment parameter comprises at least one of an amplitude adjustment parameter, a phase adjustment parameter, or a frequency adjustment parameter.

5. The apparatus of claim 1, wherein the speaker units are transparent speaker units.

6. The apparatus of claim 1, wherein the speaker units are transparent film speaker units.

7. The apparatus of claim 5, further comprising:
  a display module;

wherein, the loudspeaker array covers at least a part of a display region of the display module.

8. The apparatus of claim 7, wherein the display module is a panel display module, and
  wherein, the loudspeaker array and the panel display module are superposed along a normal direction of a display plane of the panel display module.

9. The apparatus of claim 1, wherein, the obstacle detection module comprises:
  a touch sensing unit covering at least a part of the loudspeaker array, and configured to sense a position of the obstacle relative to the touch sensing unit.

10. The apparatus of claim 9, wherein the touch sensing unit is further configured to sense the shape of at least a portion of the obstacle in contact with the touch sensing unit.

11. The apparatus of claim 9, wherein the display module comprises a touch input unit, and
  wherein the touch sensing unit and the touch input unit are a same unit.

12. The apparatus of claim 1, wherein the obstacle detection module comprises:
  a proximity sensing unit configured to sense a position of the obstacle relative to the proximity sensing unit inside a proximity sensing range.

13. The apparatus of claim 12, wherein the proximity sensing unit is further configured to sense the shape of a portion of the obstacle inside the proximity sensing range.

14. A method, comprising:
  detecting, by a device comprising a processor, at least one obstacle parameter corresponding to at least one obstacle inside at least one space on at least one side of at least one sound-making surface of a loudspeaker array, where the loudspeaker array comprises a plurality of speaker units, and each speaker unit of the plurality of speaker units is configured to make sound according to respective input signals, at least two of the respective input signals corresponding to at least two speaker units in the plurality of speaker units being different; and
  adjusting, according to the at least one obstacle parameter, the respective input signals corresponding to at least one speaker unit of the plurality of speaker units, to compensate for a sound-making effect of the loudspeaker array influenced by the at least one obstacle to facilitate reducing a difference between a first waveform at a target location of the loudspeaker array under the influence of the obstacle and a second waveform at the target location corresponding to the loudspeaker array when not under the influence of the obstacle.

15. The method of claim 14, wherein the adjusting the input signal comprises:
  determining, according to the at least one obstacle parameter, the at least one speaker unit and an input signal adjustment parameter corresponding to the at least one speaker unit; and
  adjusting, according to the input signal adjustment parameter, the respective input signals corresponding to the at least one speaker unit.

16. The method of claim 14, wherein the determining the at least one speaker unit and the input signal adjustment parameter corresponding to the at least one speaker unit further comprises:
  determining, according to the at least one obstacle parameter, at least one of a position parameter of the obstacle, a shape parameter of the obstacle, a posture parameter of the obstacle, or an acoustic characteristic parameter of the obstacle; and determining, according to a determined relevant parameter of the obstacle, the at least one speaker unit and the input signal adjustment parameter corresponding to the at least one speaker unit.

17. The method of claim 16, wherein the input signal adjustment parameter comprises at least one of an amplitude adjustment parameter, a phase adjustment parameter, or a frequency adjustment parameter for the input signal.

18. The method of claim 14, wherein the plurality of speaker units are transparent speaker units.

19. The method of claim 14, wherein the plurality of speaker units are transparent film speaker units.

20. The method of claim 18, further comprising:
displaying in a display region according to a display input signal, wherein the at least one sound-making surface of the loudspeaker array covers at least one part of the display region.

21. The method of claim 20, wherein the display region is a plane display region, and the at least one sound-making surface of the loudspeaker array and the plane display region are superposed along a normal direction of the plane display region.

22. The method of claim 14, wherein the detecting the at least one obstacle parameter comprises:
sensing a position of the at least one obstacle in a touch sensing region, wherein the touch sensing region covers at least one part of the at least one sound-making surface of the loudspeaker array.

23. The method of claim 22, wherein the detecting the at least one obstacle parameter further comprises:
sensing at least one shape of at least one portion of the at least one obstacle in the touch sensing region.

24. The method of claim 14, wherein the detecting the at least one obstacle parameter comprises:
sensing at least one position of the at least one obstacle inside a proximity sensing range.

25. The method of claim 24, wherein the detecting the at least one obstacle parameter further comprises:
sensing at least one shape of at least one portion of the at least one obstacle inside the proximity sensing range.

26. A computer readable storage device comprising executable instructions that, in response to execution, cause a device comprising a processor to perform operations, comprising:
detecting an obstacle parameter corresponding to an obstacle inside a space on a side of a sound-making surface of a loudspeaker array, wherein the loudspeaker array comprises a plurality of speaker units, and each speaker unit of the plurality of speaker units is configured to make sound according to an input signal, input signals corresponding to at least two speaker units in the speaker units being different; and
reducing a difference between a first waveform and a second waveform by adjusting, according to the obstacle parameter, the input signal corresponding to speaker unit of the plurality of speaker units, to compensate for a sound-making effect of the loudspeaker array influenced by the obstacle, wherein the first waveform, at a target location of the loudspeaker array, corresponds to the loudspeaker array encumbered by the obstacle, and wherein the second waveform, at the target location, corresponds to the loudspeaker array unencumbered by the obstacle.

27. The computer readable storage device of claim 26, wherein the adjusting the input signal comprises:
determining, according to the obstacle parameter, a speaker unit of the plurality of speaker units;
determining, according to the obstacle parameter, an input signal adjustment parameter corresponding to the speaker unit; and
adjusting, according to the input signal adjustment parameter, a corresponding input signal for the speaker unit.

28. The computer readable storage device of claim 27, wherein the determining the input signal adjustment parameter further comprises:
determining, according to the obstacle parameter, at least one of a position parameter of the obstacle, a shape parameter of the obstacle, a posture parameter of the obstacle, or an acoustic characteristic parameter of the obstacle.

* * * * *